(12) United States Patent
Sugiyo

(10) Patent No.: US 12,719,112 B2
(45) Date of Patent: Aug. 25, 2026

(54) SECONDARY CELL AND METHOD FOR MANUFACTURING THE SAME

(71) Applicant: KANADEVIA CORPORATION, Osaka (JP)

(72) Inventor: Takeshi Sugiyo, Osaka (JP)

(73) Assignee: KANADEVIA CORPORATION, Osaka (JP)

( * ) Notice: Subject to any disclaimer, the term of this patent is extended or adjusted under 35 U.S.C. 154(b) by 706 days.

(21) Appl. No.: 17/614,852

(22) PCT Filed: May 28, 2020

(86) PCT No.: PCT/JP2020/021197

§ 371 (c)(1),
(2) Date: Nov. 29, 2021

(87) PCT Pub. No.: WO2020/241781

PCT Pub. Date: Dec. 3, 2020

(65) Prior Publication Data

US 2022/0231356 A1 Jul. 21, 2022

(30) Foreign Application Priority Data

May 30, 2019 (JP) ................................ 2019-100829

(51) Int. Cl.
*H01M 50/103* (2021.01)
*H01M 10/04* (2006.01)
*H01M 10/0585* (2010.01)

(52) U.S. Cl.
CPC ..... *H01M 50/103* (2021.01); *H01M 10/0468* (2013.01); *H01M 10/0585* (2013.01)

(58) Field of Classification Search
CPC .......... H01M 10/0585; H01M 50/103; H01M 10/0468; H01M 10/049
See application file for complete search history.

(56) References Cited

U.S. PATENT DOCUMENTS

| | | |
|---|---|---|
| 6,232,015 B1 | 5/2001 | Wyser |
| 2005/0147880 A1 | 7/2005 | Takahashi et al. |

(Continued)

FOREIGN PATENT DOCUMENTS

| | | |
|---|---|---|
| CN | 102934259 A | 2/2013 |
| EP | 3561898 A1 | 10/2019 |

(Continued)

OTHER PUBLICATIONS

Machine translation of JP 2011238504 A (Year: 2011).*

(Continued)

*Primary Examiner* — Jessie Walls-Murray
(74) *Attorney, Agent, or Firm* — CUSHMAN PARTNERS, LLC

(57) ABSTRACT

The present invention provides a secondary cell that can be downsized with improved cell performance, and a method for manufacturing the same. In an example of an embodiment according to the present invention, a secondary cell includes an outer package and an object to be housed in the outer package. The object to be housed includes an electrode body. The outer package has a pressing portion for locally pressing at least one of the obverse side and the reverse side of the object to be housed.

5 Claims, 4 Drawing Sheets

(56) References Cited

U.S. PATENT DOCUMENTS

| | | | | |
|---|---|---|---|---|
| 2011/0135997 | A1* | 6/2011 | Watanabe | H01M 50/562 29/623.5 |
| 2011/0250485 | A1* | 10/2011 | Tsukuda | H01M 10/0481 429/153 |
| 2012/0328917 | A1* | 12/2012 | Sakashita | H01M 50/60 29/623.2 |
| 2013/0078493 | A1* | 3/2013 | Chen | H01M 50/105 429/96 |
| 2013/0108909 | A1 | 5/2013 | Matsuo et al. | |
| 2013/0148264 | A1 | 6/2013 | Hagiwara | |
| 2015/0134172 | A1 | 5/2015 | Ose et al. | |
| 2015/0194640 | A1* | 7/2015 | Tsukuda | H01M 50/147 429/185 |
| 2019/0288246 | A1 | 9/2019 | Kato et al. | |
| 2021/0135276 | A1 | 5/2021 | Sugiyo et al. | |
| 2021/0184244 | A1* | 6/2021 | Taniuchi | H01M 50/102 |
| 2023/0352724 | A1* | 11/2023 | Okamoto | H01M 50/10 |

FOREIGN PATENT DOCUMENTS

| | | | |
|---|---|---|---|
| JP | H 03-116707 | A | 5/1991 |
| JP | 05-013054 | A | 1/1993 |
| JP | H 05-028973 | A | 2/1993 |
| JP | 2864175 | B2 * | 3/1999 |
| JP | 2994798 | B2 * | 12/1999 |
| JP | 2000-67821 | A | 3/2000 |
| JP | 2002-532858 | A | 10/2002 |
| JP | 2005-191455 | A | 7/2005 |
| JP | 2009-187889 | A | 8/2009 |
| JP | 2011-222388 | A | 11/2011 |
| JP | 2011-238504 | A | 11/2011 |
| JP | 2013-58665 | A | 3/2013 |
| JP | 2014-010916 | A | 1/2014 |
| JP | 5543269 | B | 7/2014 |
| JP | 6123642 | B2 | 5/2017 |
| JP | 2018-081820 | A | 5/2018 |
| JP | 2019-021428 | A | 2/2019 |
| KR | 10-2018-0071983 | A | 6/2018 |
| WO | 00/36693 | A1 | 6/2000 |
| WO | 2018/123319 | A1 | 7/2018 |

OTHER PUBLICATIONS

Machine translation of JP-2864175-B2 (Year: 1999).*

Machine translation of JP 2994798 B2 (Year: 1999).*

International Search Report dated Aug. 4, 2020 issued in corresponding International Patent Application No. PCT/JP2020/021197 with English translation.

Notice of Reasons for Refusal dated Mar. 23, 2023, issued in corresponding Japanese Patent Application No. 2019-100829 with English translation (6 pgs.).

Extended European Search Report dated Mar. 22, 2024, issued in corresponding European Patent Application No. 20812921.3 (6 pgs.).

Notice of Reasons for Refusal dated Oct. 4, 2022, issued in corresponding Japanese Patent Application No. 2019-100829, with English translation (6 pgs.).

Request for the Submission of an Opinion dated Jan. 9, 2025, issued in corresponding Korean Patent Application No. 10-2021-7042855 with English translation (14 pgs.).

* cited by examiner

F I G. 1
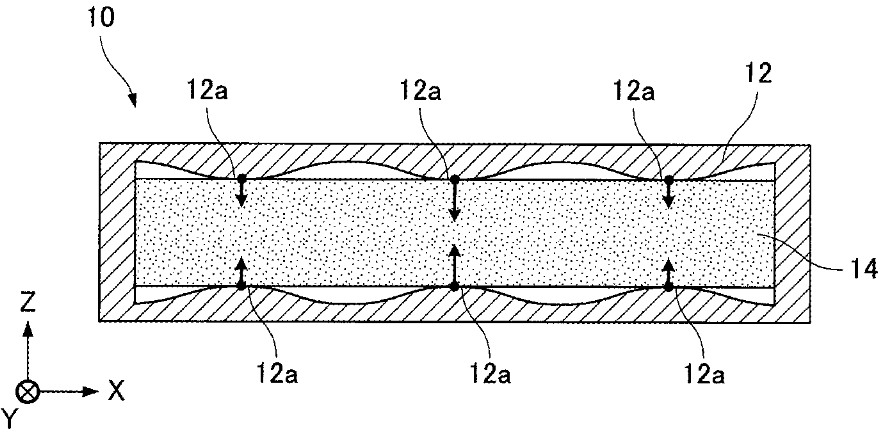
F I G. 2
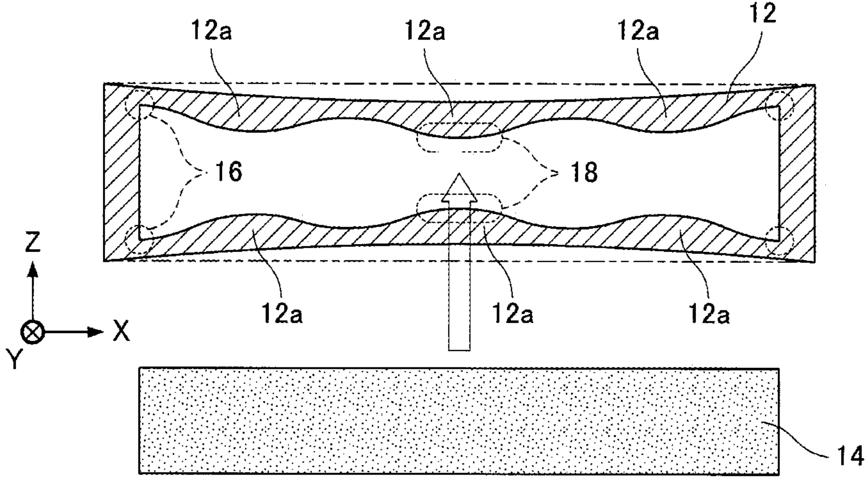

F I G. 5
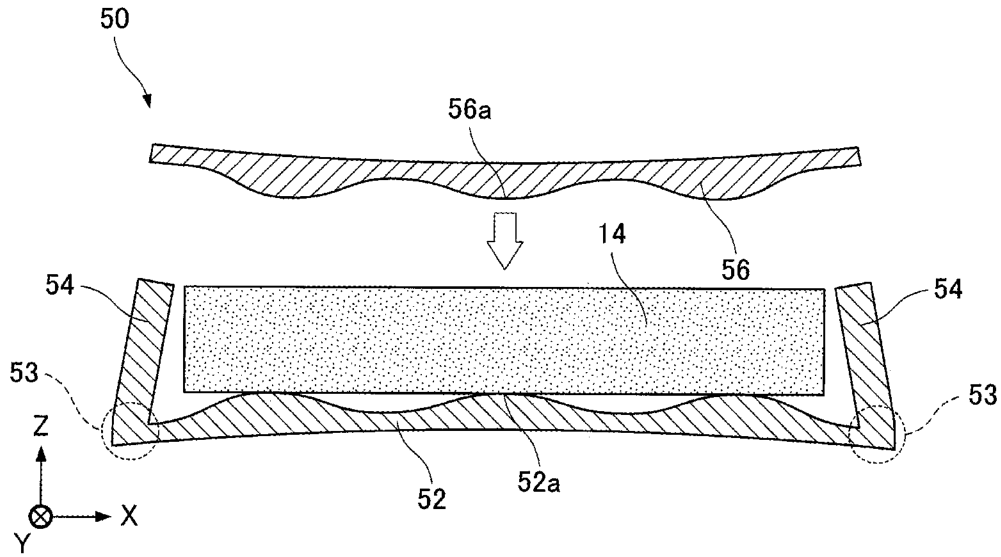
F I G. 6
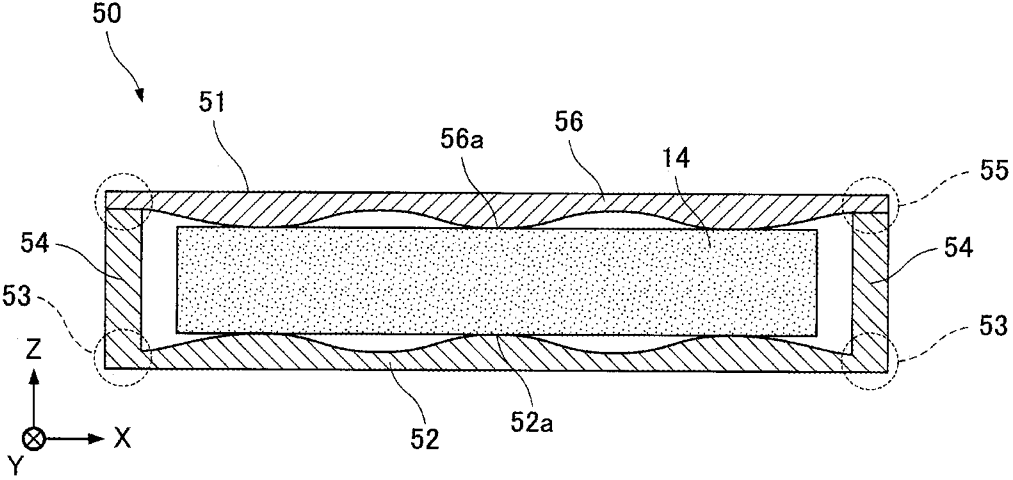

SECONDARY CELL AND METHOD FOR MANUFACTURING THE SAME

CROSS-REFERENCE TO RELATED APPLICATIONS

This application is the U.S. National Stage of PCT/JP2020/021197, filed May 28, 2020, which claims priority to Japanese Patent Application No. 2019-100829, filed May 30, 2019, the entire contents of both of which are herein incorporated by reference in their entireties.

TECHNICAL FIELD

The present invention relates to a secondary cell and a method for manufacturing the same.

BACKGROUND ART

A typical secondary cell has a structure in which an electrode body is housed in an outer package, e.g., a casing. The electrode body includes a positive electrode layer, an intermediate layer, and a negative electrode layer that are stacked in this order. Moreover, a positive electrode current collector is disposed on the outer surface of the positive electrode layer while a negative electrode current collector is disposed on the outer surface of the negative electrode layer.

A secondary cell including a solid electrolyte as an intermediate layer is particularly called an all-solid-state cell that is assumed to be superior in productivity and cell characteristics (including an energy density) to a cell including a liquid electrolyte.

In order to obtain an all-solid-state cell with excellent characteristics, a contact resistance between the layers is desirably kept at a sufficiently low resistance. Specifically, it is desirable to improve contact between the layers in the electrode body, contact between the positive electrode layer and the positive electrode current collector, contact between the negative electrode layer and the negative electrode current collector, and, when a plurality of electrode bodies are stacked, contact between the electrode bodies.

For example, a conventional all-solid-state cell described in Japanese Patent No. 6123642 includes a pressurizing portion for applying a retaining pressure in the stacking direction (perpendicularly to the stacking surface) of the cell.

SUMMARY OF INVENTION

Technical Problem

However, when a secondary cell (all-solid-state cell) is provided with the pressurizing portion and a pressure control unit for controlling the pressurizing portion as described in Japanese Patent No. 6123642, the secondary cell including the pressurizing portion and the pressure control unit may increase in volume. Since the pressurizing portion and the pressure control unit do not store energy, the provision thereof may deteriorate the performance (particularly an energy density) of the overall secondary cell.

In other words, in order to secure contact between layers in the electrode body of the conventional secondary cell, the overall secondary cell is likely to upsize with deteriorated cell performance. An object of the present invention is to provide a secondary cell that can be downsized with improved cell performance, and a method for manufacturing the same.

Solution to Problem

In order to solve the problem, a secondary cell according to an embodiment of the present invention includes an outer package and an object to housed in the outer package, wherein the object to be housed includes an electrode body, and the outer package has a pressing portion for locally pressing at least one of the obverse side and the reverse side of the object to be housed.

The pressing portion is preferably at least one protrusion provided on the inner surface of the outer package. The pressing portion preferably configured to press one of the obverse side and the reverse side of the object to be housed at least at the central portion of the outer package.

More preferably, the outer package has a flat outer surface. Moreover, a corner in the outer package preferably includes an acute-angled portion. Furthermore, the electrode body preferably contains a powder material.

A method for manufacturing a secondary cell as an embodiment according to the present invention includes: holding an object to be housed having an electrode body, between an obverse-side plate and a reverse-side plate, at least one of the obverse-side plate and the reverse-side plate having a pressing portion for locally pressing at least one of the obverse side and the reverse side of the object to be housed; and forming an outer package of the secondary cell by connecting the obverse-side plate and the reverse-side plate via side plates extending between the obverse-side plate and the reverse-side plate.

The manufacturing method preferably further includes connecting a side plate of the side plates extending from the outer edge of one plate of the obverse-side plate and the reverse-side plate toward the other plate of the obverse-side plate and the reverse-side plate, to one of the other plate and a side plate of the side plates extending from the other plate toward the one plate.

More preferably, the obverse-side plate and the reverse-side plate are connected to each other via the side plates such that a corner in the outer package of the secondary cell includes an acute-angled portion. Furthermore, the outer package of the secondary cell is preferably formed in a vacuum.

Advantageous Effect of Invention

According to the secondary cell and the method for manufacturing the same of the present invention, the object to be housed including the electrode body is pressed by the pressing portion of the outer package, thereby keeping a low contact resistance in the electrode body without the external pressurizing portion of the related art. Thus, the cell performance of the secondary cell is expected to improve. Moreover, additional configurations for pressurization, for example, the pressurizing portion and the pressure control unit are not necessary, thereby downsizing the secondary cell.

BRIEF DESCRIPTION OF DRAWINGS

FIG. 1 is a schematic diagram illustrating a secondary cell according to an embodiment of the present invention.

FIG. 2 schematically illustrates an outer package and an object to be housed in the outer package in order to describe the structure of the secondary cell of FIG. 1.

FIG. 5 schematically illustrates a reverse-side plate connected to side plates, the housed object placed on the reverse-side plate, and an obverse-side plate before being connected to the side plates, in order to describe a method for manufacturing the secondary cell according to the embodiment of the present invention.

FIG. 6 illustrates the obverse-side plate connected to the side plates after the state of FIG. 5.

DESCRIPTION OF EMBODIMENT

Figure 3A:
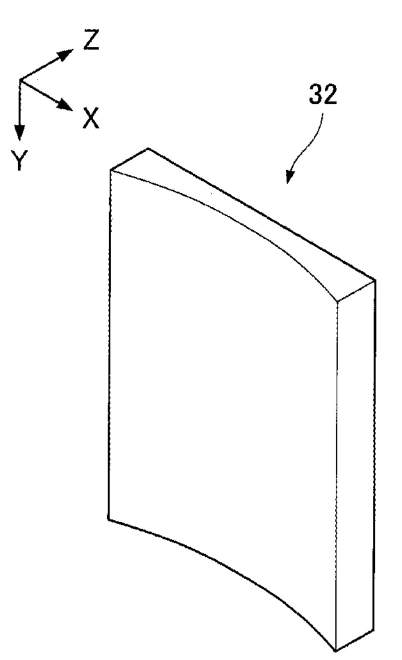
FIG. 3A illustrates a modification of the outer package, in which one of an obverse-side plate and a reverse-side plate is flat.

A schematic diagram in FIG. 1 illustrates a secondary cell 10 according to an embodiment of the present invention. The secondary cell 10 includes an outer package 12 and an object 14 housed in the outer package 12. The housed object 14 includes an electrode body.

The detailed structure of the electrode body is not illustrated. Typically, an electrode body having a laminated structure is used, in which an intermediate layer is interposed between a positive electrode layer and a negative electrode layer. The positive electrode layer, the intermediate layer, and the negative electrode layer that are included in the electrode body may be made of powder materials. Moreover, a positive electrode current collector is disposed on the outer surface of the positive electrode layer of the electrode body while a negative electrode current collector is disposed on the outer surface of the negative electrode layer. The housed object 14 may include a laminated package containing the electrode body in a sealed manner, in addition to the electrode body. The housed object may include a plurality of stacked electrode bodies. If a plurality of electrode bodies are stacked, the electrode bodies may be placed in various forms including a series connection, a parallel connection, and a combination of a series connection and a parallel connection. For example, in the case of a parallel connection of electrode bodies, in a part (internal structure) other than the outer surface of the overall housed object, a positive electrode current collector is preferably disposed between the positive electrode layers of the electrode bodies so as to electrically connect the positive electrode layers, and a negative electrode current collector is preferably disposed between the negative electrode layers of the electrode bodies so as to electrically connect the negative electrode layers.

As illustrated in FIG. 1, the inner surface of the outer package 12 has a plurality of asperities including inward convex portions (protrusions) that serve as pressing portions 12*a* for pressing the housed object 14. The pressing portions 12*a* press the stacking surfaces (the extended surfaces of the layers) of the electrode body included in the housed object 14. Specifically, the pressing portions 12*a* press the obverse side and the reverse side of the housed object 14 in a height direction Z that is the stacking direction (perpendicular to the stacking surfaces) of the electrode body having the laminated structure in FIG. 1 (the obverse side is an upper side in the height direction Z while the reverse side is a lower side in the height direction Z, the obverse and reverse sides may be switched).

As has been mentioned, the inner surface of the outer package 12 has a plurality of asperities and thus the obverse side and the reverse side of the housed object 14 are pressed by the pressing portions 12*a* at the inward convex portions of the asperities. In other words, the pressing portions 12*a* locally press the obverse side and the reverse side of the housed object 14. The pressing portions 12*a* are particularly formed into inward convex portions at a central portion provided in a width direction X (orthogonal to the height direction Z that is the stacking direction of the electrode body), thereby securing a pressing force at the central portion where a pressing force is likely to decrease.

In this configuration, the outer package 12 desirably includes an elastic body (e.g., metals such as aluminum and stainless steel and synthetic resin) that facilitates the application of a pressing force from the outer package 12 to the housed object 14. In other words, the housed object 14 is preferably pressed by an elastic force of the outer package 12.

FIG. 2 illustrates the structure of the secondary cell 10 in which the outer package 12 includes an elastic body. As illustrated in FIG. 2, before the object 14 is housed in the outer package 12 according to the present embodiment, the upper surface and the lower surface of the outer package 12 internally have a plurality of asperities as the pressing portions 12*a*, the upper and lower surfaces extending orthogonally to the height direction Z in FIG. 2. Furthermore, the entire outer package 12 is considerably curved inward like large undulations (the overall surfaces are curved to protrude inward). A central portion 18 in the width direction X particularly has a small clearance in the height direction Z, the clearance being smaller in the height direction Z than the dimension of the object 14 to be housed.

When the secondary cell 10 in FIG. 1 is formed by using the outer package 12 and the object 14 to be housed in FIG. 2, the object 14 to be housed is inserted into an opening as indicated by an arrow in FIG. 2, the opening being formed in a depth direction Y (a direction perpendicular to the height direction Z and the width direction X and also perpendicular to the plane of FIG. 2) of the outer package 12 so as to receive the object 14 to be housed. When the object 14 to be housed is inserted into the outer package 12 that is entirely curved inward like large undulations as illustrated in FIG. 2, the outer package 12 is deformed along the outside shape of the housed object 14 into a shape illustrated in FIG. 1 (a rectangular edge and a substantially flat outer surface).

However, the elasticity of the elastic body constituting the outer package 12 allows the outer package 12 to return toward the shape of FIG. 2 (entirely curved inward like large undulations). Thus, as indicated by arrows in FIG. 1, a pressing force derived from an elastic force is applied from the pressing portions 12*a* to the housed object 14. A large pressing force is applied particularly to the central portion where a clearance is smaller than the housed object 14 before the object 14 to be housed is inserted. In this way, the present embodiment can increase a pressing force at the central portion that is remote from ends in the width direction X and is likely to receive a small pressing force.

Furthermore, the pressing portions 12*a* are locally provided in the present embodiment, allowing a pressing force applied by the elasticity of the outer package 12 to the object 14 to be housed to concentrate on the pressing portions 12*a*. This can more efficiently apply a pressing force to the object 14 to be housed while concentrating the pressing force at points to be pressed, as compared with a pressure uniformly applied to the overall inner surface of the outer package 12.

Moreover, in the present embodiment, corners 16 at ends in the width direction X in the outer package 12 have acute angles as illustrated in FIGS. 1 and 2. In other words, the upper surface and the lower surface in the height direction Z in the outer package 12 are entirely angled inward, ensuring the application of a pressing force to the obverse side and the reverse side of the object 14 to be housed.

As has been discussed, a pressing force derived from the shape and material of the outer package 12 is applied to the housed object 14 in the secondary cell 10 according to the present embodiment, eliminating the need for providing pressurizing portion and a pressure control unit in addition to the outer package 12 and the housed object 14 unlike in the related art. Thus, the secondary cell 10 of the present embodiment can improve in cell performance with a contact resistance reduced in the electrode body by a pressing force applied to the housed object 14, and can be downsized by eliminating the need for a redundant configuration.

Furthermore, the outer surface of the outer package 12 is substantially flat while the object 14 is housed as illustrated in FIG. 1. Thus, if multiple secondary cells 10 are placed next to one another to obtain high power (series connection) or a large capacity (parallel connection), no clearance is made between the adjacent secondary cells 10. This does not form any redundant spaces in the overall configuration, thereby keeping a high energy density per volume in the assembly of the secondary cells 10.

If the intermediate layer of the electrode body provided in the housed object 14 is a solid-electrolyte layer, which is made of a powder material and is formed by a dry process, and the overall secondary cell 10 (all-solid-state cell) is fabricated with a large pressing force, a certain pressure is obtained in the housed object 14. Thus, the use of powder materials eliminates the need for a large pressure from the outer package of the housed object, so that the asperities on the inner surface of the outer package only require a small depth and the inner surface only requires a small degree of curvature with respect to the outer surface. Hence, in this case, a volume in the outer package 12 is not so small before the insertion of the object 14 to be housed, so that the object 14 to be housed is easily inserted into the outer package 12.

In FIG. 2, the upper side (facing the obverse side of the object 14 to be housed) and the lower side (facing the reverse side of the object 14 to be housed), in the height direction Z, of the inner surface of the outer package 12 are entirely curved inward before the insertion of the object 14 to be housed. It is not always necessary to curve both of the obverse side and the reverse side.

Figure 3B:
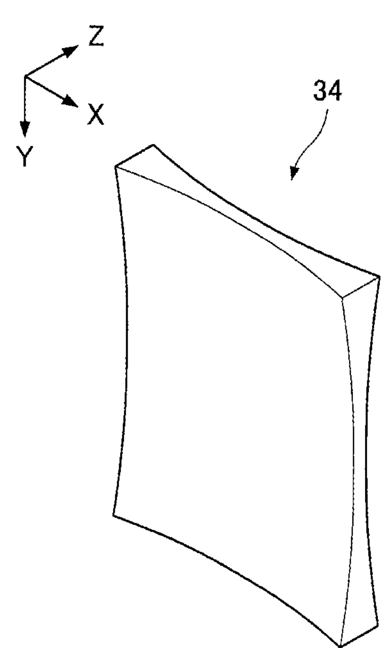
FIG. 3B illustrates a modification of the outer package, in which a central portion protrudes inward along the width direction and the depth direction of the outer package.

FIGS. 3A and 3B illustrate outer packages 32 and 34 according to modifications. In the outer package 32 illustrated in FIG. 3A, a plate constituting the inner surface of the lower side (reverse side) in the height direction Z is curved inward like the outer package 12 of FIG. 2 while a plate constituting the inner surface of the upper side (obverse side) in the height direction Z is flattened. In this way, the outer package 32 has a flat inner surface on one of the obverse side and the reverse side. Also in this configuration, when the object 14 to be housed is inserted into the outer package 32, a pressing force is applied by elasticity from the curved plate to the housed object 14. If a necessary pressing force is obtained only by a pressing force from one of the obverse side and the reverse side, it is not always necessary to press the housed object 14 from both of the obverse side and the reverse side. Hence, like the outer package 32 of FIG. 3A, one of the plates on the obverse side and the reverse side may be flattened (the obverse side) or right-angled portions (corners on the obverse side) may be included instead of acute-angled corners.

The plate curved to protrude inward on the reverse side in the outer package 32 of FIG. 3A is curved along the width direction X (a distance from the flat outer surface with the housed object 14 changes along the width direction X) but is not curved in the depth direction Y (perpendicular to the height direction Z and the width direction X). However, the plate of the outer package 32 may be also curved along the depth direction Y. In the outer package 34 illustrated in FIG. 3B, plates on the obverse side and the reverse side are curved to protrude inward in both of the width direction X and the depth direction Y. A distance between the plates on the obverse side and the reverse side is minimized particularly at a central portion in the width direction X and the depth direction Y. The object 14 to be housed in the outer package 34 having such a shape is housed with a pressing force received from the obverse side and the reverse side, the pressing force changing along the width direction X and the depth direction Y. Thus, a desired pressing force can be applied to a desired point. For example, corners that are likely to be broken by an excessive force may not receive a pressing force.

Figure 4A:
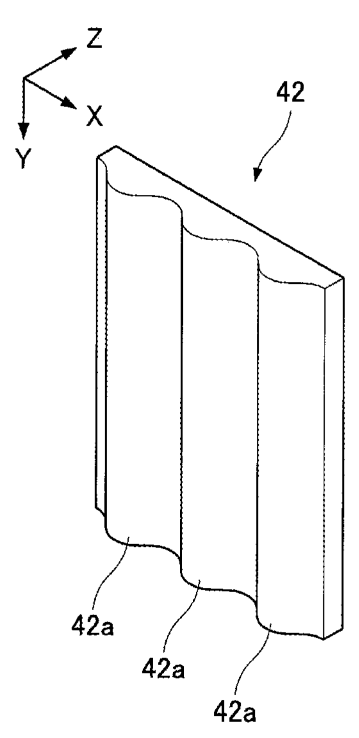
FIG. 4A illustrates an enlarged perspective view and a modification of pressing portions, in which a plurality of protrusions are formed in the width direction with a constant height along the depth direction.
Figure 4B:
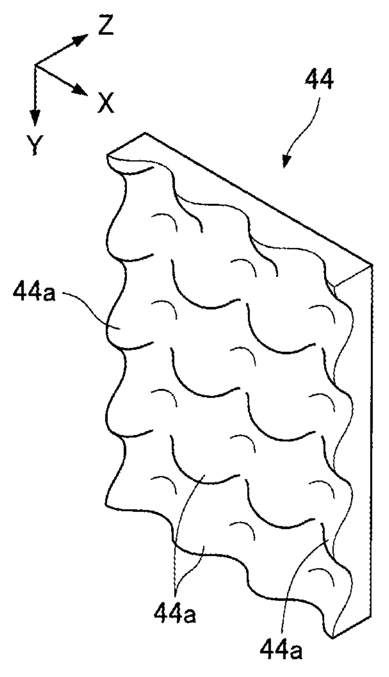
FIG. 4B illustrates an enlarged perspective view and a modification of pressing portions, in which protrusions vary in height along the depth direction.
Figure 4C:
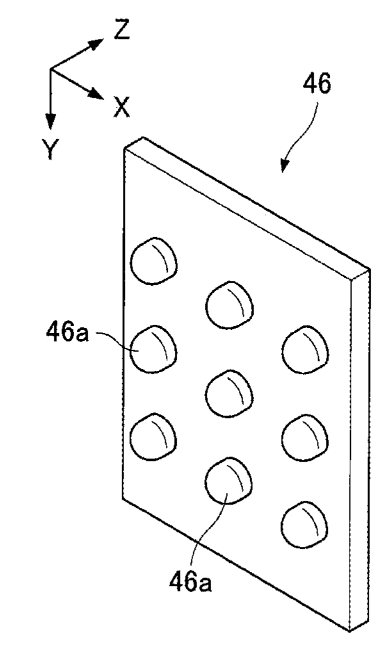
FIG. 4C illustrates an enlarged perspective view and a modification of the pressing portions, in which a plurality of columnar protrusions are formed.

In order to apply a pressing force changing along the width direction X and the depth direction Y to the housed object 14, the pressing portions 12*a* in FIG. 1 may be deformed in the depth direction Y in addition to curvatures on the overall plate in both directions. FIGS. 4A, 4B, and 4C illustrate enlarged perspective views of the pressing portions 12*a* and modifications thereof. For the sake of simplicity, FIGS. 4A, 4B, and 4C only illustrate the inner surface of the plate on the obverse side of the outer package 12. The plate is entirely flattened and is not curved to protrude inward.

Pressing portions 42*a* of an outer package 42 in FIG. 4A are protrusions formed in the width direction X with a constant height along the depth direction Y. This shape is wavy in cross section in an X-Z plane and is rectangular in cross section in a Y-Z plane, which is relatively easily formed. Pressing portions 44*a* of an outer package 44 in FIG. 4B are protrusions formed in the width direction X with a height changing along the depth direction Y. This shape is wavy in cross section in the X-Z plane and in cross section in the Y-Z plane, which can be formed by processing for deforming the flat surface into a wavy form in the width direction X and in the depth direction Y. According to another modification, columnar protrusions may be formed as pressing portions 46*a* of an outer package 46 in FIG. 4C instead of the wavy form.

A method for manufacturing a secondary cell will be described below according to an embodiment of the present invention. FIGS. 5 and 6 schematically illustrate the method for manufacturing a secondary cell 50 according to the present embodiment. In FIG. 2, the object 14 to be housed is inserted into the opening provided in the depth direction Y of the outer package 12, whereas in FIGS. 5 and 6, an outer package 51 is divided into a reverse-side plate 52 (a lower plate in the height direction Z) and an obverse-side plate 56 (the other upper plate in the height direction Z), and the object 14 to be housed is held between the obverse-side plate 56 and the reverse-side plate 52.

In FIG. 5, a plurality of pressing portions 52*a* are provided to locally press the reverse side (the lower surface of the housed object 14 in the height direction Z) of the object 14 to be housed, and the reverse side of the object 14 to be housed is disposed on the reverse-side plate 52 that is entirely curved to protrude upward. Furthermore, side plates 54 extending in the height direction Z are connected to the outer edges (the left and right ends in the width direction X) of the reverse-side plate 52. In this configuration, the side plate 54 is connected such that an acute angle is formed at a corner 53 between the reverse-side plate 52 and the side plate 54. Thus, the side plates 54 extend to tilt slightly inward in the width direction X with respect to the height direction Z. The side plates 54 are preferably connected to the reverse-side plate 52 such that the outer edges of the reverse-side plate 52 are bent or drawn to form the side plates 54. In this case, as indicated at the corner 53, the reverse-side plate 52 and the side plate 54 are formed by a combined material.

Moreover, pressing portions 56*a* are provided to locally press the obverse side (the upper surface of the housed object 14 in the height direction Z) of the housed object 14 from above in the height direction Z, and the obverse-side plate 56 entirely curved to protrude downward is pressed (pressurized) to the obverse side of the housed object 14 and the distal ends of the side plates 54. In this configuration, the reverse-side plate 56 curved to protrude upward and the obverse-side plate 54 curved to protrude downward are elastic bodies that are pressed (pressurized) to be deformed along the shape of the housed object 14. Hence, when the outer surface (undersurface) of the reverse-side plate 52 and the outer surface (top surface) of the obverse-side plate 56 are deformed flat as illustrated in FIG. 6, the side plates 54 are placed along the height direction Z. In this state, the distal ends of the side plates 54 in the height direction Z are connected to the outer edges of the obverse-side plate 56 by means such as welding.

The secondary cell 50 including the outer package 51 illustrated in FIG. 6 is manufactured thus. Specifically, the obtained outer package 51 has a flat outer surface and an inner surface having the pressing portions 56*a* that press the obverse side of the housed object 14 and the pressing portions 52*a* that press the reverse side of the housed object 14. In the outer package 51, the housed object 14 is held between the obverse-side plate 56 having the pressing portions 56*a* and the reverse-side plate 52 having the pressing portions 52*a*, and the obverse-side plate 56 and the reverse-side plate 52 are connected to each other via the side plates 54 extending between the obverse-side plate 56 and the reverse-side plate 52.

In this manufacturing method, the side plates 54 are attached in advance (bent in advance) to the outer edges of the reverse-side plate 52 with an acute angle at the corner 53, thereby placing the side plates 54 in the height direction Z when the curved reverse-side plate 52 and obverse-side plate 56 are elastically deformed to flatten the outer surface. As illustrated in FIG. 6, although the side plates 54 are placed in the height direction Z, the pressing portions 52*a* of the reverse-side plate 52 and the pressing portions 56*a* of the obverse-side plate 56, particularly the pressing portions 52*a* and 56*a* near the side plates 54 are protruded inward, so that acute angles are formed at the corner 53 between the reverse-side plate 52 and the side plate 54 and at the corner 55 between the obverse-side plate 56 and the side plate 54 in the outer package 51.

In this configuration, the acute angles at the corners 53 and 55 do not mean geometrically strict intersections of straight lines. Even if the intersection of the outer end of one of the reverse-side plate 52 and the obverse-side plate 56 and the side plate 54 is not the intersection of straight lines in cross section, any acute angle may be formed between the plane of the outer end of one of the reverse-side plate 52 and the obverse-side plate 56 and the extending direction of the side plate 54. For example, if the side plate 54 is formed by bending the reverse-side plate 52, the corner 53 may be formed into a round corner (including a round portion) instead of an intersection between straight lines depending upon the shape of a tool (a tool with a rounded tip). Also in this case, it is assumed that the corner 53 includes an acute-angled portion as long as an acute angle is formed between the extending direction of the side plate 54 and the extending surface (tangent plane) of the reverse-side plate 52 near the corner 53. Also in this case, the housed object 14 held between the reverse-side plate 52 and the obverse-side plate 56 securely receives pressing forces from both of the obverse side and the reverse side. In this way, one of the corner 53 and the corner 55 of the outer package 51 may include an acute-angled portion as long as the outer end of one of the reverse-side plate 52 and the obverse-side plate 56 and the side plate 54 are connected to each other so as to securely apply a pressing force to the obverse side and the reverse side of the housed object 14.

In FIG. 5, the corner 53 has an acute angle, and a clearance between the side plates 54 and the housed object 14 is illustrated to clarify the curves of the reverse-side plate 52 and the obverse-side plate 56. However, the clearance between the side plates 54 and the housed object 14 can be reduced depending upon the angle of the corner 53 and the degree of curvatures of the reverse-side plate 52 and the obverse-side plate 56. The presence of a clearance does not affect the performance of the secondary cell 50. If the outer package 51 is particularly formed in a vacuum, the performance of the secondary cell 50 is not reduced by the influence of atmospheric components in a clearance or an atmospheric pressure.

Figure 7A:
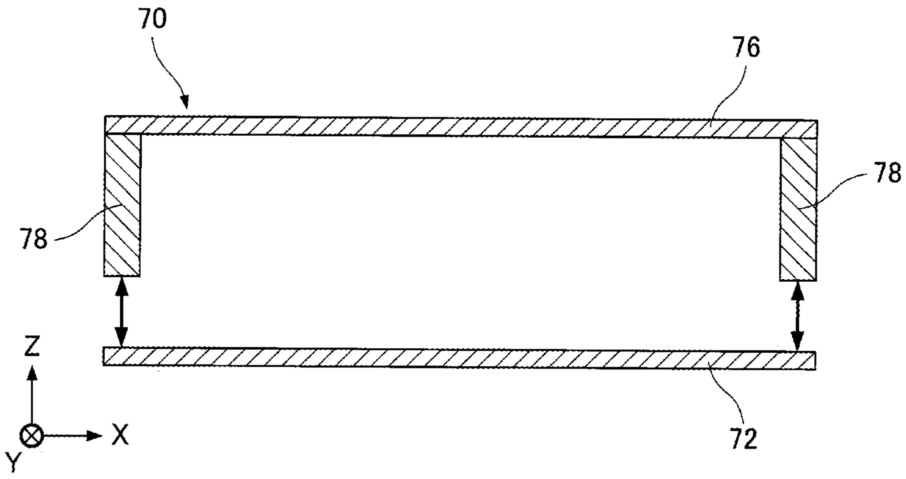
FIG. 7A schematically illustrates a modification of the manufacturing method, in which the side plates are connected in advance to the obverse-side plate.
Figure 7B:
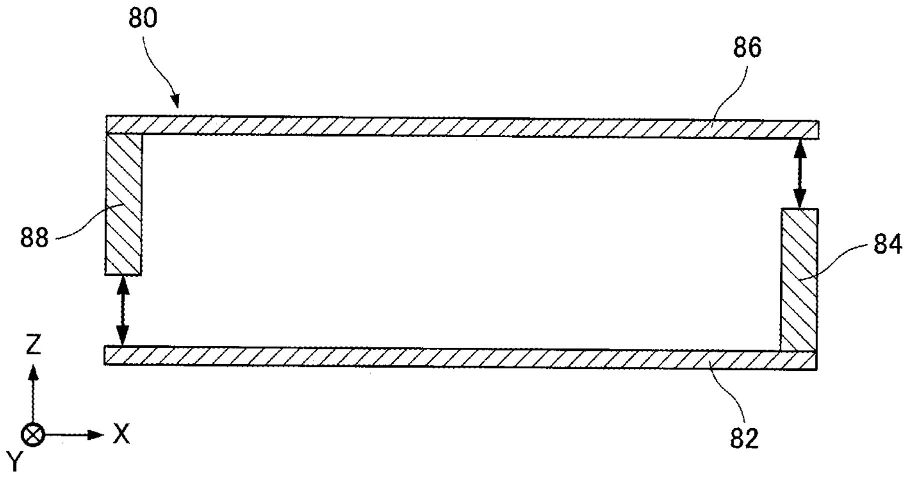
FIG. 7B schematically illustrates a modification of the manufacturing method, in which a side plate is connected in advance to each of the obverse-side plate and the reverse-side plate.
Figure 7C:
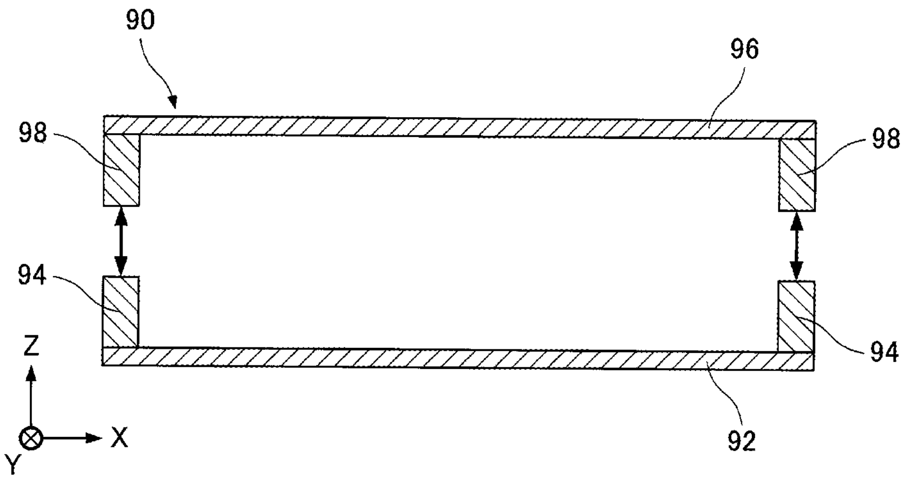
FIG. 7C schematically illustrates a modification of the manufacturing method, in which side plates on the obverse-side plate and side plates on the reverse-side plate are connected to each other.

In FIGS. 5 and 6, the two side plates 54 are connected to the outer edges of the reverse-side plate 52 (one plate), and the obverse-side plate 56 (the other plate) is connected to the side plates 54. The reverse-side plate 52, the side plates 54, and the obverse-side plate 56 can be connected in varying combinations. The method for attaching the side plates 54 to the reverse-side plate 52 and the obverse-side plate 56 is not limited to bending. For example, the side plates 54 made of a material separate from the reverse-side plate 52 and the obverse-side plate 56 may be connected to the outer edges of the reverse-side plate 52 and the obverse-side plate 56 by means such as welding. FIGS. 7A, 7B, and 7C schematically illustrate modifications of the manufacturing method, in which the relation of connection and the connecting method are changed. In these modifications, the side plates are made of a material separate from the reverse-side plate and the obverse-side plate. In FIGS. 7A, 7B, and 7C, the illustration of the pressing portions and the housed object is omitted, and only the relation of connection of the reverse-side plate, the side plates, and the obverse-side plate is illustrated.

In FIG. 7A, side plates 78 are connected in advance to the outer edges of an obverse-side plate 76 by methods such as welding but are not connected to a reverse-side plate 72 (actually, the side plates 78 are preferably connected with acute-angled corners). The lower ends of the side plates 78 are then connected to the reverse-side plate 72, forming an outer package 70.

In FIG. 7B, a reverse-side side plate 84 is connected in advance to one side (the right side in FIG. 7B) of the outer edge of a reverse-side plate 82 while an obverse-side side plate 88 is connected in advance to one side (the left side in FIG. 7B) of the outer edge of an obverse-side plate 86. The upper end of the reverse-side side plate 84 is then connected to the obverse-side plate 86, and the lower end of the obverse-side side plate 88 is connected to the reverse-side plate 82, which forms an outer package 80.

In FIG. 7C, reverse-side side plates 94 and obverse-side side plates 98 are connected in advance to the outer edge of a reverse-side plate 92 and the outer edge of an obverse-side plate 96, respectively. The upper ends of the reverse-side side plates 94 and the lower ends of the obverse-side side plates 98 are connected to each other, which forms an outer package 90.

The secondary cell 10 illustrated in, for example, FIG. 1 according to the foregoing embodiment is particularly assumed to be an all-solid-state cell that includes a solid electrolyte as the intermediate layer of an electrode body and is manufactured by a dry process. However, the secondary cell 10 may be a liquid-based cell containing liquid electrolyte in the intermediate layer. The housed object 14 may include a plurality of stacked electrode bodies, each having the laminated structure.

Moreover, the pressing portions 12*a* in, for example, FIG. 1 are not always to be provided on both of the obverse side and the reverse side. At least one of the obverse side and the reverse side of the housed object 14 is to be locally pressed. In other words, the pressing portions 12*a* may be provided on only one of the obverse side and the reverse side.

The pressing portions 12*a* may have any shapes that can locally press the housed object 14. For example, FIG. 4C illustrates the modification in which the columnar protrusions (pressing portions 46*a*) are cylindrical with dome-shaped tops. The pressing portions 12*a* may be, for example, prisms or dome-shaped portions may be directly attached to a flat plate. Alternatively, the pressing portions 12*a* may be carved from a flat plate or protrusions may be attached to a flat plate. Moreover, the pressing portions 12*a* are not always to be integrated with plates such as the reverse-side plate and the obverse-side plate. Members separate from the plate may be attached to the outer package 12 so as to form the pressing portions 12*a*. For example, the outer package may include a sheet disposed inside the plate, and protrusions or a wavy pattern may be formed as the pressing portions 12*a* on the sheet.

FIG. 1 illustrates the three pressing portions 12*a* placed along the width direction X. The number of pressing portions 12*a* is not limited to three and thus may be larger than or smaller than three. A pressing portion 12*a* applies a pressure to the housed object 14 at the central portion in the width direction X (the pressing portion 12*a* protrudes inward to the obverse side or the reverse side). A pressure is not to be always applied to the central portion. The pressing portions 12*a* may be provided in various layouts and shapes according to points for pressing. Conversely, it is desirable to avoid pressing structurally fragile portions such as corners (these portions are concave inward).

For example, in FIG. 6, the outer package 51 of the secondary cell 50 is surrounded by the reverse-side plate 52, the side plates 54, and the obverse-side plate 56. Additionally, lids may be attached to openings near and remote from a viewer of FIG. 6 in the depth direction Y so as to completely seal the housed object 14. In this case, the outer package 51 is sealed and evacuated, thereby keeping a vacuum therein and allowing the housed object 14 to be pressed by an atmospheric pressure. Thus, a contact resistance is expected to decrease in the electrode body. However, if the secondary cell 50 is covered with a case or the like in addition to the outer package 51, sealing is not necessary. In any configuration, an electrode terminal serving as an electrical connecting portion of the electrode body is to be drawn out of the outer package 51. The inner surface of the outer package 51 is desirably insulated.

REFERENCE SIGNS LIST

10 Secondary cell
12 Outer package
12*a* Pressing portion
14 Object to be housed
16 Corner
18 Central portion
32 Outer package
34 Outer package
42 Outer package
42*a* Pressing portion
44 Outer package
44*a* Pressing portion
46 Outer package
46*a* Pressing portion
50 Secondary cell
51 Outer package
52 Reverse-side plate
53 Corner
54 Side plate
55 Corner
56 Obverse-side plate
70 Outer package
72 Reverse-side plate
76 Obverse-side plate
78 Side plate
80 Outer package
82 Reverse-side plate
84 Reverse-side side plate
86 Obverse-side plate
88 Obverse-side side plate
90 Outer package
92 Reverse-side plate
94 Reverse-side side plate
96 Obverse-side plate
98 Obverse-side side plate

The invention claimed is:

1. A secondary cell comprising:
an outer package; and
an object housed in the outer package,
wherein the object includes an electrode body having a positive electrode layer, an intermediate layer, and a negative electrode layer, wherein the intermediate layer is a solid-electrolyte layer being interposed between the positive electrode layer and the negative electrode layer, wherein the positive electrode layer, the intermediate layer, and the negative electrode layer are stacked in a stacking direction, wherein the positive electrode layer, the intermediate layer, and the negative electrode layer are made of powder materials, wherein the outer package has an obverse plate and a reverse plate opposed to the obverse plate, wherein the outer package has a plurality of pressing portions formed integrally with an internal surface of said at least one of the obverse plate and the reverse plate of the outer package for locally pressing at least one of an obverse side and a reverse side of the object to be housed, the outer package having a width direction and a depth direction perpendicular to the width direction, the width direction and the depth direction being perpendicular to the stacking direction, the plurality of pressing portions separately arranged along the width direction or the depth direction, wherein each of the obverse plate and the reverse plate has an inwardly curved shape in a state in which the object is not housed in the outer package and each of the obverse plate and the reverse plate assumes a flat shape in a state in which the object is housed in the outer package, wherein, in an initial assembled state of the secondary cell prior to a charging/discharging operation, the obverse plate and the reverse plate apply a pressing force to the object so as to reduce electrical contact resistance within the object, and wherein one of the plurality of pressing portions is disposed on a center of the outer package in the width direction and the depth direction.

2. The secondary cell according to claim 1, wherein the plurality of pressing portions include at least one protrusion provided on an inner surface of the outer package.

3. The secondary cell according to claim 1, wherein the plurality of pressing portions are configured to press one of the obverse side and the reverse side of the object to be housed at least at a central portion of the outer package.

4. The secondary cell according to claim 1, wherein the outer package has a flat outer surface.

5. The secondary cell according to claim 1, wherein a corner in the outer package includes an acute-angled portion.

* * * * *